(12) United States Patent
Matsumoto et al.

(10) Patent No.: US 7,462,671 B2
(45) Date of Patent: Dec. 9, 2008

(54) THERMOPLASTIC RESIN COMPOSITION, MOLDED ARTICLE, AND FILM

(75) Inventors: Hideki Matsumoto, Nagoya (JP); Daisuke Sato, Yonezawa (JP); Akiko Tanaka, Nagoya (JP); Toru Yamanaka, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/547,887

(22) PCT Filed: Mar. 5, 2004

(86) PCT No.: PCT/JP2004/002900

§ 371 (c)(1),
(2), (4) Date: Oct. 31, 2005

(87) PCT Pub. No.: WO2004/081110

PCT Pub. Date: Sep. 23, 2004

(65) Prior Publication Data

US 2006/0100391 A1    May 11, 2006

(30) Foreign Application Priority Data

Mar. 12, 2003    (JP) ............................. 2003-066497

(51) Int. Cl.
*C08F 283/00*    (2006.01)
*C08F 34/02*    (2006.01)

(52) U.S. Cl. ...................................... 525/418; 526/266

(58) Field of Classification Search ................. 525/418; 526/266
See application file for complete search history.

(56) References Cited

U.S. PATENT DOCUMENTS 4,874,824 A * 10/1989 Hallden-Abberton et al. ........................... 525/379

(Continued)

FOREIGN PATENT DOCUMENTS

EP    0 306 133 A1    3/1989

(Continued)

OTHER PUBLICATIONS

Machine translation of JP2002284816.*

(Continued)

*Primary Examiner*—Randy Gulakowski
*Assistant Examiner*—Alicia M Toscano
(74) *Attorney, Agent, or Firm*—DLA Piper LLP (US)

(57) ABSTRACT

The present invention relates to a thermoplastic resin composition which contains a thermoplastic polymer (A) containing a glutaric anhydride-containing component shown in the following general formula (1),

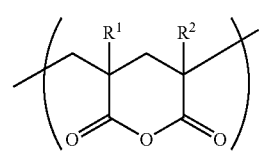

(1)

where $R^1$ and $R^2$ are the same or different and each represents a hydrogen atom or an alkyl group having 1 to 5 carbon atoms, and a rubber-containing polymer compound (B), and satisfies the following conditions of (I) and/or (II), (I) a total light transmittance per 2 mm of the thickness of the thermoplastic resin composition is more than 90%, (II) a weight-average molecular weight of a thermoplastic polymer (A) is from 30,000 to 150,000 and a glass transition temperature is at least 130° C.

According to the present invention, a thermoplastic composition having high heat resistance, superior mechanical properties, colorless transparency, optical isotropy and moldability, as well as solvent resistance, is provided.

14 Claims, 1 Drawing Sheet

U.S. PATENT DOCUMENTS 5,338,804 A * 8/1994 Toritani et al. .............. 525/310
6,147,162 A * 11/2000 Tadokoro et al. ............ 525/222

FOREIGN PATENT DOCUMENTS

| | | |
|---|---|---|
| EP | 0 318 197 A | 5/1989 |
| EP | 1 496 067 A | 1/2005 |
| EP | 1 496 067 A1 | 1/2005 |
| GB | 1 437 176 A1 | 5/1976 |
| JP | 60-067557 A1 | 4/1985 |
| JP | 60-67557 A1 | 4/1985 |
| JP | 60-120734 A1 | 6/1985 |
| JP | 04-277546 A1 | 10/1992 |
| JP | 05-186659 A1 | 7/1993 |
| JP | 06 145455 A | 5/1994 |
| JP | 10 158466 A | 6/1998 |
| JP | 10-279766 A1 | 10/1998 |
| JP | 2000-178399 A1 | 6/2000 |
| JP | 2002-284816 A1 | 10/2002 |
| JP | 2002-293835 A1 | 10/2002 |
| JP | 2002284816 A * | 10/2002 |

OTHER PUBLICATIONS

Machine translation of JP 2002-284816A.*

* cited by examiner

THERMOPLASTIC RESIN COMPOSITION, MOLDED ARTICLE, AND FILM

TECHNICAL FIELD

This disclosure relates to a thermoplastic resin composition having remarkably excellent heat resistance, colorless transparency, flowability and mechanical properties, and to a molded product and film containing the thermoplastic resin composition.

BACKGROUND

Amorphous resins, such as polymethyl methacrylate (referred to as PMMA hereinafter) or polycarbonate (referred to as PC hereinafter), have been widely used in the art in optical materials and in individual components of domestic electrical appliances, office equipment, automobiles, and so on, since they have high transparency and dimensional stability.

In recent years, these resins have been widely used as optical materials having higher performance, especially, for optical lenses, prisms, mirrors, optical discs, optical fibers, sheets or films for liquid crystal displays, light transmission plates, or the like. Therefore, the required optical properties, moldability and heat resistance of the resin must to be high.

Furthermore, at present these transparent resins are also used as lighting fixtures in automobiles or the like, such as tail lamps and headlamps. In recent years, in order to increase the space in automobiles or improve fuel consumption, there has been a trend to reduce the space between light sources and various lenses, such as tail lamps, inner lenses, headlamps, shield beams or the like, and to reduce the thickness of various parts, and excellent moldability is required. Further, since automobiles are used in extreme conditions, little change in shape at high temperature and humidity, and excellent scratch resistance, weatherability, and oil resistance are also required.

However, although the PMMA resin has excellent transparency and weatherability, this resin has problems in that the heat resistance and impact resistance are insufficient. On the other hand, although the PC resin has excellent heat resistance and impact resistance, this resin has problems in that a birefringence, which is optical strain, is large, thus generating optical anisotropy in the molded product, and the moldability, scratch resistance and solvent resistance are substantially lower.

Therefore, in order to improve the heat resistance of PMMA, resins having a maleimide monomer, a maleic anhydride monomer, or the like introduced as a component giving heat resistance have been developed. However, a problem with the maleimide monomer is that the cost is high and reactivity is low, and a problem with the maleic anhydride monomer is that the thermal stability is insufficient.

As a method for solving such problems, a copolymer containing a glutaric anhydride-containing component was disclosed in GB1437176A and EP0306133A, wherein the component is obtained by heating a copolymer containing an unsaturated carboxylic acid monomer component by using an extruder and carrying out a cyclizing reaction. Furthermore, as a method for improving the mechanical properties such as the impact resistance or the like, a method was disclosed in JP60-67557A, JP60-120734A, JP4-277546A and JP5-186659A wherein a rubber-containing polymer compound is added to a copolymer containing the unsaturated carboxylic acid monomer component. However, in the methods disclosed in these patent documents, although the mechanical properties such as the impact resistance can be improved, there are problems in that the transparency of the resin composition is remarkably decreased and a stress optical coefficient (birefringence), that is optical anisotropy, is increased. No material having sufficient mechanical properties such as impact resistance and; good optical properties (transparency, optical isotropy), which have been required in recent years have not yet been known.

It would therefore be advantageous to provide a thermoplastic resin composition having high heat resistance and mechanical properties, high colorless transparency, optical isotropy and moldability (flowability), which have been required in recent years, and also having solvent resistance.

SUMMARY

We disclose a thermoplastic resin composition which contains a thermoplastic polymer (A) containing a glutaric anhydride-containing component shown in the following general formula (1),

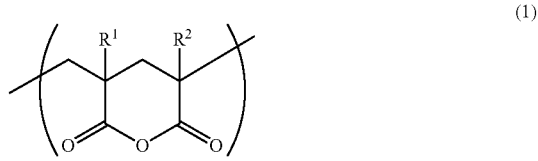

(where $R^1$ and $R^2$ are the same or different and each represents a hydrogen atom or an alkyl group having 1 to 5 carbon atoms), and a polymer-containing a rubber compound (B), and satisfies the following conditions of (I) and/or (II), that is, (I) the total light transmittance per 2 mm thickness of the thermoplastic resin composition is 90% or more, and (II) the weight-average molecular weight of the thermoplastic polymer (A) is from 30,000 to 150,000 and the glass transition temperature is at least 130° C.

Furthermore, we disclose a molded product and film containing the thermoplastic resin composition.

DETAILED DESCRIPTION

Figure 1:
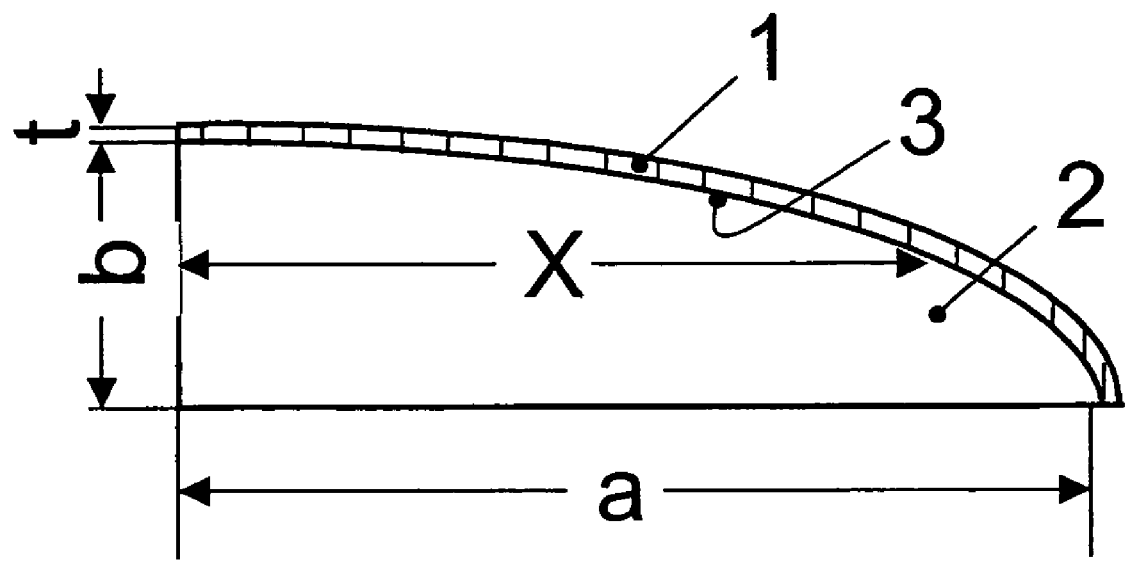
FIG. 1 is a schematic view of a ¼-elliptic jig and a plate-shaped molded product in the evaluation of the solvent resistance in examples.

Hereinafter, the thermoplastic resin composition will be described in detail.

A thermoplastic polymer (A) is a thermoplastic polymer containing a glutaric anhydride-containing component shown in the following general formula (1) as mentioned above.

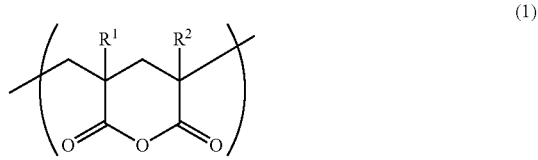

Where $R^1$ and $R^2$ are the same or different and each represents a hydrogen atom or an alkyl group having 1 to 5 carbon atoms.

In particular, it is preferable that the copolymer contains (i) the glutaric anhydride-containing component shown in the above general formula (1) and (ii) an unsaturated carboxylic acid alkyl ester component.

The content of the glutaric anhydride-containing component (i) shown in the above general formula (1) in the thermoplastic polymer (A) is preferably 25 to 50 percent by weight in 100 percent by weight of the thermoplastic polymer (A), more preferably 30 to 45 percent by weight. If the glutaric anhydride-containing component is less than 25 percent by weight, the effect of improving the heat resistance is reduced, and there becomes a tendency for the birefringence characteristic (the optical isotropy) and the solvent resistance to also be reduced.

Furthermore, the content of the alkyl unsaturated carboxylate component (ii) is preferably 50 to 75 percent by weight: in 100 percent by weight of the thermoplastic polymer (A), more preferably 55 to 70 percent by weight.

In order to measure the quantity of each component in the thermoplastic polymer (A), an infrared spectrophotometer or a proton nuclear magnetic resonance ($^1$H-NMR) apparatus is used. By infrared spectroscopy, the glutaric anhydride-containing component is characterized as having absorptions at 1800 cm$^{-1}$ and 1760 cm$^{-1}$ and can be separated from the unsaturated carboxylic acid component and the alkyl unsaturated carboxylate component. Furthermore, by the $^1$H-NMR method, the copolymer composition can be determined from the integration ratio of the spectrum. For example, in the case of a copolymer comprising the glutaric anhydride-containing component, a methacrylic acid component and a methyl methacrylate component, the spectra measured in a solvent of deuterated dimethyl sulfoxide, shows peaks in 0.5-1.5 ppm representing hydrogen of an α-methyl group of methacrylic acid, methyl methacrylate and glutaric anhydride cyclic compounds, peaks in 1.6-2.1 ppm representing hydrogen in a methylene group of the main chain of the polymer, a peak at 3.5 ppm representing hydrogen of a carboxylic acid ester (—COOCH$_3$) of methyl methacrylate, and a peak at 12.4 ppm representing hydrogen in carboxylic acid of methacrylic acid. Furthermore, in the case of a copolymer containing styrene as another copolymer component in addition to the above-mentioned components, peaks in 6.5-7.5 ppm representing hydrogen in an aromatic ring of styrene is shown. Similarly, the copolymer component can be determined from the spectrum ratio.

Furthermore, the thermoplastic polymer can contain an unsaturated carboxylic acid component (iii) and/or another vinyl monomer component (iv), in addition to the above components (i) and (ii). The other vinyl monomer component (iv) is a copolymerizable vinyl monomer component which does not belong to any of the above components (i) to (iii).

The content of the unsaturated carboxylic acid component (iii) contained in 100 percent by weight of the thermoplastic polymer (A) is preferably 10 percent by weight or less, that is, 0 to 10 percent by weight, more preferably 0 to 5 percent by weight, and most preferably 0 to 1 percent by weight. If the content of the unsaturated carboxylic acid component (iii) is more than 10 percent by weight, there is a tendency for the colorless transparency and storage stability to be decreased.

Furthermore, the content of the other vinyl monomer component (iv) is preferably 10 percent by weight or less, that is, in the range of 0 to 10 percent by weight in 100 percent by weight of the thermoplastic polymer (A). Furthermore, as the other vinyl monomer component (iv), a vinyl monomer component not containing an aromatic ring is preferable. In the case of an aromatic vinyl monomer component such as styrene or the like, if the content of the component is high, there is a tendency for the colorless transparency, the optical isotropy and the solvent resistance to be decreased, thus the content is preferably 5 percent by weight or less, that is, in the range of 0 to 5 percent by weight, more preferably 0 to 3 percent by weight.

As the above-mentioned unsaturated carboxylic acid component (iii), components having a structure shown in the following general formula (2) is preferable.

Where $R^3$ represents a hydrogen atom or an alkyl group having 1 to 5 carbon atoms.

As the above-mentioned alkyl unsaturated carboxylate component (ii), components having a structure shown in the following general formula (3) is preferable.

Where $R^4$ represents a hydrogen atom or an alkyl group having from 1 to 5 carbon atoms, $R^5$ represents an aliphatic or an alicyclic hydrocarbon group having 1 to 6 carbon atoms, or an aliphatic or an alicyclic hydrocarbon group having from 1 to 6 carbon atoms which is substituted with hydroxyl groups or halogen of between 1 and the number of the carbon atoms.

Furthermore, as for the thermoplastic polymer (A), the weight-average molecular weight is preferably 30,000 to 150,000, more preferably 50,000 to 130,000, and most preferably 70,000 to 110,000. When the weight-average molecular weight is within this range, the coloring in the later process at the time of degassing by heating can be decreased, and a polymer having a low yellowness index can be obtained, and furthermore, the mechanical strength of the molded product can be increased. In addition, the weight-average molecular weight indicates the weight-average molecular weight, where the molecular weight is the absolute molecular weight measured by gel permeation chromatography with multi-angle laser light scattering detector (GPC-MALLS).

The glass transition temperature of the thermoplastic polymer (A) is preferably at least 130° C., more preferably at least 140° C. and most preferably at least 150° C. in consideration of the heat resistance. Furthermore, the maximum glass transition temperature is about 170° C. in general. In addition, the glass transition temperature in this case is the glass transition temperature (Tg), which is measured using a differential scanning calorimetry apparatus (DSC-7 type produced by Perkin-Elmer Company) while raising the temperature by 20° C./minute.

As the thermoplastic polymer (A) obtained in this manner, the yelloness index value is 5 or less, thues the coloring is substantially controlled, is more preferably 4 or less, and most preferably 3 or less, thus the thermoplastic polymer has excellent colorlessness. Therefore, the yellowness index of the thermoplastic resin composition containing the thermoplastic polymer (A) is also reduced to 5 or less, more preferably 4 or less, and the most preferably 3 or less, thus the resin composition is preferable since a molded product and film having excellent colorlessness can be obtained. Furthermore, in the case where the yellowness index value of the thermoplastic polymer (A) is large, since a part of the thermoplastic polymer (A) is thermally decomposed, there is a tendency for the mechanical properties of the thermoplastic resin composition containing the thermoplastic polymer (A) to be decreased. As a result, it is preferable that the yellowness index of the thermoplastic polymer (A) is within the above-mentioned range. In addition, the yellowness index in this case is the YI value obtained by measuring the molded product having a thickness of 2 mm using an SM color computer (produced by Suga Test Instruments Co. Ltd.) according to JIS-K7103, wherein the molded product is obtained by injection molding of the thermoplastic polymer (A) or the thermoplastic resin composition.

The thermoplastic polymer (A) containing the glutaric anhydride-containing component shown in the above general formula (1) can be basically-produced by the following method. That is, the unsaturated carboxylic acid monomer and the alkyl unsaturated carboxylate monomer, which produce the glutaric anhydride-containing component (i) shown in the above general formula (1) after the heating process, are copolymerized to obtain a copolymer (a). At this time, in the case of the above-mentioned other vinyl monomer component (iv) being contained, the vinyl monomer, which produces the other vinyl monomer component, may be copolymerized. The obtained copolymer (a) is heated in the presence or absence of a suitable catalyst to initiate an intramolecular cyclization reaction by dealcoholization and/or dehydration. Then, the thermoplastic polymer (A) can be produced. In this case, one component of the above-mentioned glutaric anhydride-containing component (i) can be made typically by heating the copolymer (a) to allow a dehydration reaction between carboxyl groups in two components of the unsaturated carboxylic acid component (iii) being adjacent to each other, or a dealcoholization reaction between the unsaturated carboxylic acid component (iii) and the alkyl unsaturated carboxylate component (ii) being adjacent to each other.

As the unsaturated carboxylic acid monomer used here, all unsaturated carboxylic acid monomers capable of copolymerizing with the other vinyl compound can be used. As the preferable unsaturated carboxylic acid monomer, a compound shown in the following general formula (4), such as maleic acid and a hydrolyzate of maleic anhydride, or the like can be used.

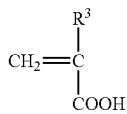

(4)

Where $R^3$ represents a hydrogen atom or an alkyl group having 1 to 5 carbon atoms.

In particular, acrylic acid or methacrylic acid is preferable since these monomers have excellent heat stability, and methacrylic acid is more preferable. These monomers can be used alone or in combination. In addition, the unsaturated carboxylic acid monomer shown in the above general formula (4) produces the unsaturated carboxylic acid component (iii) having the structure shown in the above general formula (2), by copolymerizing.

Furthermore, as a preferable example of the alkyl unsaturated carboxylate monomer, the monomer shown in the following general formula (5) can be used.

(5)

Where $R^4$ represents a hydrogen atom or an alkyl group having 1 to 5 carbon atoms and $R^5$ represents a aliphatic hydrocarbon group or an alicyclic hydrocarbon group having 1 to 6 carbon atoms. Here, the $R^5$ may be substituted with a hydroxyl group or halogen of between 1 and the number of carbon atoms.

In these monomers, an acrylate and/or a methacrylate are particularly preferable. In addition, the alkyl unsaturated carboxylate monomer shown in the above general formula (5) produces the alkyl unsaturated carboxylate component (ii) having the structure shown in the above general formula (3), by copolymerizing.

As a preferable example of the alkyl unsaturated carboxylate monomer, the following monomers can be used, that is, methyl acrylate, methyl methacrylate, ethyl acrylate, ethyl methacrylate, n-propyl acrylate, n-propyl methacrylate, n-butyl acrylate, n-butyl methacrylate, t-butyl acrylate, t-butyl methacrylate, n-hexyl acrylate, n-hexyl methacrylate, cyclohexyl acrylate, cyclohexyl methacrylate, chloromethyl acrylate, chloromethyl methacrylate, 2-chloroethyl acrylate, 2-chloroethyl methacrylate, 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, or the like. Among these monomers, methyl methacrylate is the most preferably used. These monomers can be used alone or in combination.

Furthermore, in the production of the copolymer (a), another vinyl monomer may be used within the range, in which the effect is not lost. This other vinyl monomer produces the other vinyl component (iv), by copolymerizing. As a preferable example of the other vinyl monomer, the following monomers can be used, that is, an aromatic vinyl monomer, such as styrene, α-methylstyrene, o-methylstyrene, p-methylstyrene, o-ethylstyrene, p-ethylstyrene, p-t-butylstyrene or the like, a vinyl cyanide monomer, such as acrylonitrile, methacrylonitrile, ethacrylonitrile or the like, allyl glycidyl ether, styrene-p-glycidyl ether, p-glycidyl styrene, maleic anhydride, itaconic anhydride, N-methylmaleimide, N-ethylmaleimide, N-cyclohexylmaleimide, N-phenylmaleimide, acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazoline, 2-styryl-oxazoline, or the like. A monomer not containing an aromatic ring is more preferably used in consideration of the transparency, the optical isotropy and the solvent resistance. These monomers can be used alone or in combination.

As the polymerization method of the copolymer (a), a commonly known method, such as bulk polymerization, solution polymerization, suspension polymerization, emulsion polymerization or the like by radical polymerization, can be used. The solution polymerization, bulk polymerization and suspension polymerization are particularly preferable since there are few impurities.

As for the polymerization temperature, it is preferable that the polymerization be carried out at a polymerization temperature of 95° C. or less from the viewpoint of the color tone. Furthermore, in order to prevent the polymer discoloration after the heat treatment, a preferable polymerization temperature is 85° C. or less, and preferably 75° C. or less. Moreover, as for the minimum polymerization temperature, although it is not particularly limited if the polymerization advances, at least 50° C. is preferable from the view point of productivity in consideration of the polymerization rate, and at least 60° C. is more preferable. In order to improve the polymerization yield or the polymerization rate, the polymerization temperature can be increased as the polymerization advances. Also at this time, it is preferable that the maximum temperature be controlled to 95° C. or less, and as for the polymerization starting temperature, it is preferable that the polymerization be started at a comparatively low temperature of 75° C. or less. Furthermore, as for the polymerization time, although it is not particularly limited as long as there is sufficient time to obtain a necessary degree of polymerization, a time within the range of 60 to 360 minutes is preferable from the view point of production efficiency, and a time within the range of 90 to 180 minutes is the most preferable.

As for the preferable ratio of the monomer mixture used for producing the copolymer (a), when the whole monomer mixture is 100 percent by weight, the unsaturated carboxylic acid monomer is 15 to 50 percent by weight, more preferably 20 to 45 percent by weight, and the alkyl unsaturated carboxylate monomer is 50 to 85 percent by weight, more preferably 55 to 80 percent by weight. When the other vinyl monomer which is copolymerizable with the mixture is used, the preferable ratio of the monomer is 0 to 10 percent by weight. When the other vinyl monomer is the aromatic vinyl monomer, the preferable ratio of the monomer is 0 to 5 percent by weight, more preferably 0 to 3 percent by weight.

In the case where the content of the unsaturated carboxylic acid monomer is less than 15 percent by weight, when the thermoplastic polymer (A) is produced by heating the copolymer (a), the amount of the glutaric anhydride-containing component (i) produced, shown in the above-mentioned general formula (1), is decreased, thus there is a tendency for the heat resistance-improving effect of the thermoplastic polymer (A) to be decreased. On the other hand, in the case where the content of the unsaturated carboxylic acid monomer (iii) is more than 50 percent by weight, when the thermoplastic polymer (A) is produced by heating the copolymer (a), a large amount of unsaturated carboxylic acid component (iii) tends to remain, and thus tends to impair colorless transparency and storage stability of the thermoplastic polymer (A).

Furthermore, as mentioned above, as for the thermoplastic polymer (A), it is preferable that the weight-average molecular weight is 30,000 to 150,000. The thermoplastic polymer (A) having such a weight-average molecular weight can be obtained by controlling the copolymer so as to have a weight-average molecular weight of 30,000 to 150,000 beforehand at the time of producing the copolymer (a).

As for the method for controlling the molecular weight of the copolymer (a), for example, the molecular weight can be controlled by the addition of a radical polymerization initiator, such as an azo compound, a peroxide or the like, or the addition of a chain transfer agent, such as alkylmercaptan, carbon tetrachloride, carbon tetrabromide, dimethylacetamide, dimethylformamide, triethylamine or the like. In particular, the method using the addition of alkylmercaptan as the chain transfer agent is preferably used from the view point of the stability of the polymerization, the ease of handling or the like.

As the alkylmercaptan, for example, n-octylmercaptan, t-dodecylmercaptan, n-dodecylmercaptan, n-tetradecylmercaptan, n-octadecylmercaptan or the like can be used. Among these alkylmercaptans, t-dodecylmercaptan or n-dodecylmercaptan is preferably used.

In order to achieve a preferable molecular weight, these alkylmercaptans are added in an amount of preferably 0.2 to 5.0 parts by weight, more preferably 0.3 to 4.0 parts by weight, and most preferably 0.3 to 3.0 parts by weight to 100 parts by weight of monomer mixture.

As the method for producing the thermoplastic polymer (A) containing the glutaric anhydride-containing component, wherein the copolymer (a) is heated to carry out the intramolecular cyclization reaction by dehydration and/or dealcoholization, although it is not particularly limited, a method of passing the copolymer (a) through a heated extruder having a vent, or a method for degassing the copolymer (a) by heating under an inert gas atmosphere or a vacuum, are preferable. When the intramolecular cyclization reaction is carried out by heating under the presence of oxygen, the yellowness index tends to increase, thus it is preferable for the inside of the system to be completely saturated with an inert gas such as nitrogen or the like. As the preferable extruder, for example, a single-screw extruder having Unimelt-type screw, a twin-screw extruder, or a three-screw extruder, or a continuous or batch-type kneader can be used. In particular, a twin-screw extruder can be preferably used. Furthermore, an apparatus having a structure in which an inert gas such as nitrogen can be introduced is more preferable. For example, as the method for introducing the inert gas such as nitrogen into the twin-screw extruder, a method of connecting a pipe from the upper part and/or lower part of a hopper is used in which the inert gas flows at a rate of about 10 to 100 l/minute.

Furthermore, as for the temperature for degassing by heating by the above-mentioned method, although it is not particularly limited if the intramolecular cyclization reaction is generated by dealcoholization and/or dehydration, the temperature is preferably within the rage of 180 to 300° C., and preferably 200 to 280° C.

Furthermore, as for the time required for degassing by heating at this time, although it can be suitably set according to the desired copolymer composition, it is preferable that the time be within the range of 1 to 60, minutes in general, more preferably 2 to 30 minutes, and most preferably 3 to 20 minutes. In order for a sufficient intramolecular cyclization reaction to occur when using the extruder, the ratio of the length and diameter of the screw of the extruder (L/D) is preferably 40 or more. In the case of using an extruder having a low L/D ratio, since a large among of unreacted unsaturated carboxylic acid component remains, the reaction advances again at the time of heating and molding process, thus there is a tendency for the molded product has a silver or for bubbles, or for the color tone to become deteriorated at the time of molding.

Furthermore, when the copolymer (a) is heated by the above-mentioned method, at least one selected from an acid, an alkali and a salt compound can be added as a catalyst to advance the cyclization reaction to the glutaric anhydride. As for the amount of the catalyst added, about 0.01 to 1 parts by weight are preferable to 100 parts by weight of the copolymer (a). As the acid catalyst, hydrochloric acid, sulfuric acid, p-toluenesulfonic acid, phosphoric acid, phosphorous acid, phenylphosphonic acid, methyl phosphorate, or the like, can be used. As the basic catalyst, a metal hydroxide, amines, imines, an alkali metal derivative, alkoxides, an ammonium hydroxide salt, or the like, can be used. Furthermore, as the salt compound catalyst, a metal acetate, a metal stearate, a metal carbonate, or the like, can be used. However, it is preferable to add these catalysts in a range that does not affect on the color of the thermoplastic polymer or reduce the transparency. Among these catalysts, a compound containing alkali metals can be preferably used since the compound has an excellent reaction-advancing effect when a comparatively small amount is added. More particularly, the following compounds can be used, that is, a hydroxide, such as lithium hydroxide, sodium hydroxide, potassium hydroxide or the like, an alkoxide compound, such as sodium methoxide, sodium ethoxide, sodium phenoxide, potassium methoxide, potassium ethoxide, potassium phenoxide or the like, an organic carboxylate, such as lithium acetate, sodium acetate, potassium acetate, sodium stearate or the like. In particular, sodium hydroxide, sodium methoxide, lithium acetate and sodium acetate can be preferably used.

Since the rubber-containing polymer compound (B) is contained in the above-mentioned thermoplastic polymer (A), the excellent impact resistance can be obtained without significantly losing the excellent properties of the thermoplastic polymer (A). As the rubber-containing polymer compound (B), the following polymers can be preferably used, that is, a core-shell-type multilayered polymer (B-1), which comprises a layer containing at least one rubber polymer, at least one layer containing a different polymer to the rubber polymer, and at least one layer containing a rubber polymer at the inside of these multilayered polymers, and a graft copolymer (B-2), in which a monomer mixture comprising a vinyl monomer or the like is copolymerized in the presence of the rubber polymer.

As for the number of layers constituting the multilayered polymer (B-1), although the polymer should have at least two layers and may have at least three or four layers, it is preferable that the polymer has at least one rubber layer (core layer) at the inside of it.

As for the rubber layer in the multilayered polymer (B-1), it is not particularly limited, and a layer comprising a polymer component having rubber elasticity should be used. For example, the rubber obtained by polymerizing the following components can be used, that is, an acrylic component, a silicone component, a styrene component, a nitrile component, a conjugated diene component, a urethane component, an ethylene component, a propylene component, an isobutene component, or the like. As the preferable rubber, the rubber comprising the following components can be used, that is, acrylic component, such as an ethyl acrylate component, a butyl acrylate component or the like, silicone component, such as a dimethylsiloxane component, a phenylmethylsiloxane component or the like, styrene component, such as a styrene component, an α-methylstyrene component or the like, nitrile component, such as an acylonitrile component, a methacrylonitrile component or the like, and conjugated diene component, such as a butadiene component, an isoprene component or the like. Furthermore, the rubber comprising the component obtained by combining two or more of these components is also preferable. For example, the following rubbers can be used, that is, (1) the rubber comprising the acrylic component, such as the ethyl acrylate component, the butyl acrylate component or the like, and the silicone component, such as the dimethylsiloxane component, the phenylmethylsiloxane component or the like, (2) the rubber comprising the acrylic component, such as the ethyl acrylate component, the butyl acrylate component or the like, and the styrene component, such as the styrene component, the α-methylstyrene component or the like, (3) the rubber comprising the acrylic component, such as the ethyl acrylate component, the butyl acrylate component or the like, and the conjugated diene component, such as the butadiene component, the isoprene component or the like, and (4) the rubber comprising the acrylic component, such as the ethyl acrylate component, the butyl acrylate component or the like, the silicone component, such as the dimethylsiloxane component, the phenylmethylsiloxane component or the like, and the styrene component, such as the styrene component, the α-methylstyrene component or the like. Among these rubbers, the rubber containing the alkyl acrylate component and the substituted or unsubstituted styrene component, is the most preferable from the view point of transparency and mechanical properties. Furthermore, a rubber comprising other components is also preferable, that is, the rubber obtained by crosslinking the copolymer comprising a crosslinking component, such as a divinylbenzene component, an allyl acrylate component, a butyleneglycol diacrylate component or the like.

As for the layer other than the rubber layer in the multilayered polymer (B-1), although it is not particularly limited if the layer comprises a polymer component having thermoplasticity, it is preferable that the layer has a polymer component having a higher glass transition temperature than that of the rubber layer. As the polymer having thermoplasticity, a polymer containing at least one component selected from the following components is used, that is, an alkyl unsaturated carboxylate component, an unsaturated carboxylic acid component, an unsaturated glycidyl group-containing component, an unsaturated dicarboxylic acid anhydride component, an aliphatic vinyl component, an aromatic vinyl component, a cyanide vinyl component, a maleimide component, an unsaturated dicarboxylic acid component, another vinyl component, or the like. Among these polymers, the polymer containing the alkyl unsaturated carboxylate component is preferable, and furthermore, the polymer containing at least one component selected from the unsaturated glycidyl group-containing component, the unsaturated carboxylic acid component or the unsaturated dicarboxylic acid anhydride component, in addition to the alkyl unsaturated carboxylate, is more preferable.

As for the monomer used as a starting material of the above-mentioned alkyl unsaturated acrylate, although it is not particularly limited, alkyl acrylate, or alkyl methacrylate is preferably used. More particularly, the following monomers can be used, that is, methyl acrylate, methyl methacrylate, ethyl acrylate, ethyl methacrylate, n-propyl acrylate, n-propyl methacrylate, n-butyl acrylate, n-butyl methacrylate, t-butyl acrylate, t-butyl methacrylate, n-hexyl acrylate, n-hexyl methacrylate, 2-ethylhexyl acrylate, 2-ethylhexyl methacrylate, cyclohexyl acrylate, cyclohexyl methacrylate, stearyl acrylate, stearyl methacrylate, octadecyl acrylate, octadecyl methacrylate, phenyl acrylate, phenyl methacrylate, benzyl acrylate, benzyl methacrylate, chloromethyl acrylate, chloromethyl methacrylate, 2-chloroethyl acrylate, 2-chloroethyl methacrylate, 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5, 6-pentahydroxyhexyl methacrylate, 2,3,4,5-tetrahydroxypentyl acrylate, 2,3,4,5-tetrahydroxypentyl methacrylate, aminoethyl acrylate, propylaminoethyl acrylate, dimethylaminoethyl methacrylate, ethylaminopropyl methacrylate, phenylaminoethyl methacrylate, cyclohexylaminoethyl cyclohexyl, or the like. The methyl acrylate or the methyl methacrylate is preferably used since the impact resistance is increased. These components can be used alone or in combination.

As for the above-mentioned unsaturated carboxylic acid monomer, it is not particularly limited, and acrylic acid, methacrylic acid, maleic acid, the hydrolyzate of maleic anhydride or the like can be used. In particular, the acrylic acid and the methacrylic acid are preferable since the acids have excellent heat stability, and the methacrylic acid is more preferable. These monomers can be used alone or in combination.

As for the monomer used as a starting material of the above-mentioned unsaturated glycidyl group-containing component, it is not particularly limited, and the following monomers can be used, that is, glycidyl acrylate, glycidyl methacrylate, glycidyl itaconate, diglycidyl itaconate, allyl glycidyl ether, styrene-4-glycidyl ether, 4-glycidyl styrene, or the like. The glycidyl acrylate and the glycidyl methacrylate are preferably used since the impact resistance is increased. These components can be used alone or in combination.

As the monomer used as a starting material of the unsaturated dicarboxylic acid anhydride component, maleic anhydride, itaconic anhydride, glutaconic anhydride, citraconic anhydride, aconitic anhydride or the like can be used. The maleic anhydride is preferably used since the impact resistance is increased. These components can be used alone or in combination.

As the monomer used as a starting material of the above-mentioned aliphatic vinyl component, ethylene, propylene, butadiene or the like can be used. As the monomer used as a starting material of the above-mentioned aromatic vinyl component, the following monomers can be used, that is, styrene, α-methylstyrene, 1-vinylnaphthalene, 4-methylstyrene, 4-propylstyrene, 4-cyclohexylstyrene, 4-dodecylstyrene, 2-ethyl-4-benzylstyrene, 4-(phenylbutyl) styrene, halogenated styrene, or the like. As the monomer used as a starting material of the above-mentioned cyanide vinyl component, acrylonitrile, methacrylonitrile, ethacrylonitrile or the like can be used. As the monomer used as a starting material of the above-mentioned maleimide component, the following monomers can be used, that is, maleimide, N-methylmaleimide, N-ethylmaleimide, N-propylmaleimide, N-isopropylmaleimide, N-cyclohexylmaleimide, N-phenylmaleimide, N-(p-bromophenyl)maleimide, N-(chlorophenyl)maleimide, or the like. As the monomer used as a starting material of the above-mentioned unsaturated dicarboxylic acid component, maleic acid, monoethyl maleate, taconic acid, phthalic acid or the like can be used. As the monomer used as a starting material of the above-mentioned other vinyl component, the following monomers can be used, that is, acrylamide, methacrylamide, N-methylacrylamide, butoxymethylacrylamide, N-propylmethacrylamide, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazoline, 2-styryl-oxazoline, or the like. These monomers can be used alone or in combination.

In the multilayered polymer (B-1) containing the rubber polymer, the outermost layer (a shell layer) comprises at least one selected from the polymers containing the following components, that is, the alkyl unsaturated carboxylate component, the unsaturated carboxylic acid component, the unsaturated glycidyl group-containing component, the aliphatic vinyl component, the aromatic vinyl component, the cyanide vinyl component, the maleimide component, the unsaturated dicarboxylic acid component, the unsaturated dicarboxylic acid anhydride component, another vinyl component, or the like. Among these, at least one selected from the alkyl unsaturated carboxylate component, the unsaturated carboxylic acid component, the unsaturated glycidyl group-containing component and the unsaturated dicarboxylic acid anhydride component is preferable. The polymer containing the alkyl unsaturated carboxylate component and the unsaturated carboxylic acid component is the most preferable.

We found that when the outermost layer in the above-mentioned multilayered polymer (B-1) was the polymer containing the alkyl unsaturated carboxylate component and the unsaturated carboxylic acid component, the intramolecular cyclization reaction advanced by heating to generate the glutaric anhydride-containing component shown in the above general formula (1), as when producing the above-mentioned thermoplastic copolymer (A). Therefore, the multilayered polymer (B-1) containing the glutaric anhydride-containing component shown in the above general formula (1) in the outermost layer can be obtained by blending the multilayered polymer (B-1) with the thermoplastic copolymer (A), melting and kneading it by heating under suitable conditions, wherein the multilayered polymer (B-1) has the polymer containing the alkyl unsaturated carboxylate component and the unsaturated carboxylic acid component in the outermost layer. Thereby, the multilayered polymer (B-1) can be satisfactorily dispersed without agglomerating in the thermoplastic copolymer (A), which is in the continuous phase (matrix phase), and thus, the thermoplastic resin composition having substantially high transparency together with improved mechanical properties such as impact resistance can be produced.

As the monomer used as a starting material of the alkyl unsaturated carboxylate component, alkyl acrylate and alkyl methacrylate are preferable, and furthermore, methyl acrylate and methyl methacrylate are more preferably used.

Furthermore, as the monomer used as a starting material of the unsaturated carboxylic acid component, acrylic acid and methacrylic acid are preferable, and furthermore, methacrylic acid is more preferably used.

As a preferable example of the multilayered polymer (B-1), the following polymers can be used, that is, the polymer comprising a butyl acrylate/styrene copolymer as the core layer and a methyl methacrylate/glutaric anhydride-containing component shown in the above general formula (1) copolymer as the outermost layer, the polymer comprising a butyl acrylate/styrene copolymer as the core layer and a methyl methacrylate/glutaric anhydride-containing component shown in the above general formula (1)/methacrylic acid copolymer as the outermost layer, the polymer comprising a dimethylsiloxane/butyl acrylate copolymer as the core layer and a methyl methacrylate polymer as the outermost layer, the polymer comprising a butadiene/styrene copolymer as the core layer and a methyl methacrylate polymer as the outermost layer, the polymer comprising a butyl acrylate polymer as the core layer and a methyl methacrylate polymer as the outermost layer or the like. In these examples, "/" indicates the copolymer. Furthermore, the polymer in which any one or both of the rubber layer or the outermost layer comprises the polymer containing a glycidyl methacrylate component can also be used as a preferable example. Among these polymers, the polymer comprising the butyl acrylate/styrene copolymer as the core layer and the methyl methacrylate/glutaric anhydride-containing component shown in the above general formula (1) copolymer as the outermost layer, and the polymer comprising the butyl acrylate/styrene copolymer as the core layer and methyl methacrylate/glutaric anhydride-containing component shown in the above general formula (1)/methacrylic acid copolymer as the outermost layer, can be preferably used, since the refractive index of the multilayer polymer (B-1) can be approximated with that of the thermoplastic copolymer (A) in the continuous phase (matrix phase), a sufficient dispersion state in the resin composition can be obtained, and high transparency meeting the requirements in recent years can be obtained.

The number average particle size of the multilayered polymer (B-1) is preferably between 0.01 μm and 1000 μm. The number average particle size is more preferably between 0.02 μm and 100 μm, further preferably between 0.05 μm and 10 μm, and most preferably between 0.05 μm and 1 μm. If the size is less than the range, it is in the tendency that the impact strength of the obtained thermoplastic composition to be decreased, and if the size exceeds more than the range, the transparency may be decreased.

In the multilayered polymer (B-1), as for the weight ratio of the core and the shell to the whole multilayered polymer, it is preferable that the core is between 50 percent and 90 percent by weight, more preferably between 60 percent and 80 percent by weight.

As the multilayered polymer, a commercial product sufficient to meet the above-mentioned conditions may be used, and a product produced by a commonly known method may be used.

As the commercial product of the multilayered polymer, for example, the following products can be used, that is, "Metablen®" produced by Mitsubishi Rayon Co. Ltd., "Kaneace®" produced by Kaneka Corporation, "Paraloyd®" produced by Kureha Chemical Industry Co., Ltd., "Acryloyd®" produced by Rohm and Haas Company, "Staphyloyd®" produced by Ganz Co. Ltd., "Parapet®AS" produced by Kuraray Co. Ltd., or the like. These products can be used alone or in combination.

Furthermore, as an example of the rubber-containing graft copolymer compound (B-2) used as the rubber-containing polymer compound (B), the graft copolymer obtained by copolymerizing the monomer mixture in the presence of the rubber polymer can be used, wherein the monomer comprises the unsaturated carboxylate monomer, the unsaturated carboxylic acid monomer, the aromatic vinyl monomer, and if necessary, an other vinyl monomer capable of copolymerizing with these monomers.

As the rubber polymer used for the graft copolymer (B-2), diene rubber, acrylic rubber, ethylene rubber or the like can be used. As an example, the following graft copolymers can be used, that is, a poly-butadiene, a styrene-butadiene copolymer, a block copolymer of styrene-butadiene, an acrylonitrile-butadiene copolymer, butyl acrylate-butadiene copolymer, a polyisoprene, a butadiene-methyl methacrylate copolymer, a butyl acrylate-methyl methacrylate copolymer, a butadiene-ethyl acrylate copolymer, an ethylene-propylene copolymer, an ethylene-propylene-diene copolymer, an ethylene-isopropylene copolymer, an ethylene-methyl acrylate copolymer, or the like. These rubber polymers can be used alone or in combination.

As for the weight-average particle size of the rubber polymer constituting the graft copolymer (B-2), the range of 0.1 to 0.5 μm is preferable, and 0.15 to 0.4 μm is the most preferable. If the size is less than the range, it is in the tendency that the impact strength of the obtained thermoplastic composition to be decreased, and if the size exceeds more than the range, the transparency may be decreased. In addition, the weight-average particle size of the rubber polymer can be measured by a sodium alginate method described in "Rubber Age, Vol. 88, p. 484-490 (1960), by E. Schmidt, P. H. Biddison", that is, the particle size having a cumulative weight fraction of 50 percent is measured with the weight ratio of the creamed polybutadiene particles and the cumulative weight fraction of the sodium alginate concentration, by making use of the characteristic that the sizes of the polybutadiene particles creamed with sodium alginate differ with the sodium alginate concentration.

The graft copolymer (B-2) can be obtained, by copolymerizing 20 to 90 percent by weight, preferably 30 to 80 percent by weight, more preferably 40 to 70 percent by weight of the above-mentioned monomer (mixture), in the presence of 10 to 80 percent by weight, preferably 20 to 70 percent by weight, more preferably 30 to 60 percent by weight of the rubber polymer. If the ratio of the rubber polymer is less than or more than the range, the impact strength and the surface appearance may be decreased.

Furthermore, the graft copolymer (B-2) may contain an ungrafted copolymer generated at the time of the graft copolymerization of the monomer mixture with the rubber polymer. A graft ratio is preferably 10 to 100 percent in consideration of the impact strength. Here, the graft ratio is the weight ratio of the grafted monomer mixture to the rubber polymer. Furthermore, the ungrafted copolymer having an intrinsic viscosity of 0.1 to 0.6 dl/g measured at 30° C. in a methylethylketone solvent is preferably used from the viewpoint of the balance between the impact strength and the moldability.

As for the value of the intrinsic viscosity measured at 30° C. in the methylethylketone solvent of the graft copolymer (B-2), although it is not especially limited, the copolymer having the viscosity of 0.2 to 1.0 dl/g is preferably used from the viewpoint of the balance between the impact strength and the moldability, and 0.3 to 0.7 dl/g is more preferable.

As for the method for producing the graft copolymer (B-2), it is not particularly limited, and the graft copolymer can be obtained by a commonly known polymerization method, such as bulk polymerization, solution polymerization, suspension polymerization, emulsion polymerization or the like.

Furthermore, when the refractive index of (A), the thermoplastic polymer, approximates that of (B), the rubber-containing polymer compound, a thermoplastic resin composition having excellent transparency can be preferably obtained. More specifically, the difference in both the indexes is preferably 0.05 or less, more preferably 0.02 or less, and most preferably 0.01 or less. In order to satisfy such an index condition, two methods are used, that is, a method for preparing the composition ratio of each monomer component of the thermoplastic polymer (A), and/or a method for preparing the composition ratio of the rubber polymer or monomer used for the rubber-containing polymer compound (B).

Furthermore, the difference in the refractive indexes used refers to the difference in the refractive indexes measured by the following processes. First, the thermoplastic resin composition is completely dissolved in a solvent capable of dissolving the thermoplastic polymer (A) under suitable conditions to form a turbid solution, separating the solution into a soluble fraction and an insoluble fraction in the solvent by a centrifugation or the like. After refining the soluble fraction (containing the thermoplastic polymer (A)) and the insoluble fraction (containing the rubber-containing polymer compound (B)), the refractive index of these parts are measured (at 23° C. with a measurement wavelength of 550 nm) and the difference between the refractive indexes of these two parts is defined as the difference in the refractive indexes.

Furthermore, as for the copolymer composition of the thermoplastic polymer (A) and the rubber-containing polymer compound (B) in the resin composition, after carrying out the above-mentioned separation of the soluble component and the insoluble component in the solvent, each component is analyzed.

The weight ratio of the thermoplastic polymer (A) and the rubber-containing polymer compound (B) is preferably within the range of 99/1 to 50/50, more preferably 99/1 to 60/40, and the most preferably 99/1 to 70/30.

As for the thermoplastic resin composition, the total light transmittance is more than 90 percent, and preferably more than 92 percent. With this transmittance, the resin composition has excellent transparency. Furthermore, the maximum total light transmittance is about 94 percent in general.

Furthermore, as for the thermoplastic resin composition, a haze value (turbidity), which is one index indicating the transparency, is preferably 3 percent or less, and more preferably 1 percent or less. With this haze value, the resin composition has high transparency. Furthermore, the minimum haze value is about 0.5 percent in general.

Furthermore, both the above-mentioned total light transmittance and haze values of the thermoplastic resin composition are obtained by measuring a molded product having a thickness of 2 mm obtained by injection molding according to ASTM D-1003.

Furthermore, as for the thermoplastic resin composition, the stress optical coefficient is preferably $5 \times 10^{-12}$ $Pa^{-1}$ or less, and more preferably $4 \times 10^{-12}$ $Pa^{-1}$ or less. With this stress optical coefficient, the resin composition has excellent optical isotropy. Furthermore, the minimum stress optical coefficient is about $2 \times 10^{-12}$ $Pa^{-1}$ in general. In addition, the stress optical coefficient here is the value calculated by the following formula based on (σ) (Re) and (d).

$$\text{Stress Optical Coefficient} = Re \text{ (nm)}/d \text{ (nm)}/ \sigma(Pa)$$

Where (σ) is the stress when a non-oriented film having a thickness of about 100 μm (100±5 μm) obtained by a cast method is uniaxially stretched 1.5 times, (Re) is the retardation obtained by irradiating laser light on the sample surface of the stretched film with an angle of 90 degrees at 23° C. using an ellipsometer (a cell gap inspection apparatus, RETS-1100, produced by Otsuka Electronics Co., Ltd.) and measuring the film with light transmitted at 633 nm, and (d) is the thickness of the stretched film at 23° C.

As for the thermoplastic resin composition, the heat distortion temperature is preferably at least 100° C., more preferably at least 110° C., and most preferably at least 115° C. With this heat distortion temperature, the thermoplastic resin has excellent heat resistivity. Furthermore, the maximum heat distortion temperature is about 140° C. in general. In addition, the heat distortion temperature here is the value obtained by measuring a molded product having a thickness of 6.4 mm obtained by injection molding according to ASTM D648.

Furthermore, in the thermoplastic polymer and thermoplastic resin composition, at least one selected from the following other thermoplastic resins can be contained, that is, for example, a thermoplastic resin, such as a polyethylene, a polypropylene, an acrylic resin, a polyamide, a polyphenylene sulfide resin, a polyether ether ketone resin, a polyester, a polysulfone, a polyphenylene oxide, a polyacetal, a polyimide, a polyetherimide or the like, and a thermosetting resin, such as a phenol resin, a melamine resin, a polyester resin, a silicone resin, an epoxy resin or the like. Furthermore, the following additives maybe arbitrarily contained, that is, an ultraviolet light absorber and an antioxidant based on a hindered phenol, a benzotriazol, a benzophenone, a benzoate and a cyanoacrylate, a lubricant and a plasticizer based on a higher fatty acid, acid ester and acid amide, a higher alcohol or the like, a specific mold-releasing agent, such as montanic acid, its salt, its ester, its half-ester, stearyl alcohol, stearamide, an ethylene wax or the like, a coloring protection agent, such as phosphorous acid, hypophosphorous acid or the like, a halogen-based flame retardant, a flame retardant based on a non-halogen, such as phosphorous, silicone or the like, a nucleating agent, an antistatic agent based on amine, sulfonic acid, polyether or the like, a colorant, such as a pigment or the like. However, it is preferable to check the characteristics required of application, and to add the additive within a range such that the color of the additive does not affect the thermoplastic polymer nor reduce the transparency.

As a method for blending the thermoplastic polymer (A) and the rubber-containing polymer compound (B), the method comprising blending the thermoplastic polymer (A) and the other arbitrary component beforehand, and melting and kneading the blended polymer uniformly with the single or twin-screw extruder at 200 to 350° C. in general, can be preferably used. Furthermore, the method comprising mixing both components (A) and (B) in a solvent solution to dissolve the components, and removing the solvent, can also be used.

Furthermore, as for the method for producing the thermoplastic resin composition, the method comprising blending the above-mentioned copolymer (a) and the rubber-containing polymer compound (B) beforehand, and melting and kneading the blended polymer uniformly with the single or twin-screw extruder at 200 to 350° C., can be used in general. In this way, the copolymer (a) can form the thermoplastic polymer by the above-mentioned cyclization reaction, and furthermore, component (B) can be blended. Furthermore, at this time, when the copolymer comprising the unsaturated carboxylic acid monomer component and the alkyl unsaturated carboxylate monomer component is contained in a part of component (B), the cyclization reaction can be simultaneously carried out.

As for the thermoplastic resin composition, the mechanical properties and the moldability are excellent, and melt molding can be carried out, and thus extrusion molding, injection molding, press molding or the like can be carried out. Therefore, the resin composition can be molded into a product having a desired shape and size, such as a film, sheet, pipe, rod or others.

As a method for producing the film comprising the thermoplastic resin composition, a commonly known method can be used. That is, a production method, such as an inflation method, a T-die method, a calender method, a cutting method, a cast method, an emulsion method, a hotpress method or the like, can be used. The inflation method, the T-die method, the cast method and the hotpress method can be preferably used. In the case of the inflation method or the T-die method, an extruder-type melting extruder equipped with a single or twin-screw extrusion screw can be used. The melt extrusion temperature for producing the film is preferably 150 to 350° C., and more preferably 200 to 300° C. Furthermore, when the melting and kneading are carried out using the melting extruder, it is preferable that the melting and kneading are carried out under a reduced pressure or under a nitrogen atmosphere by using the vent, from the viewpoint color control. Furthermore, when the film is produced by the cast method, a solvent, such as tetrahydrofuran, acetone, methylethylketone, dimethylformamide, dimethylsulfoxide, N-methylpyrrolidone or the like, can be used. The preferable solvent is acetone, methylethylketone, or N-methylpyrrolidone. The film can be produced by dissolving the thermoplastic resin composition with at least one of the above-mentioned solvents, casting the solution on a plate or a roll comprising a heat-resistant film, such as polyethylene terephthalate, a steel belt, or a metallic foil by using a bar coater, a T die, a T die with a bar, a die coat, and vaporizing and removing the solvent as a dry process, or solidifying the solution with a solidifying liquid as a wet process.

The molded product or film obtained in this way has excellent heat resistance and can be used in various applications, such as an electric or electronic part, an automobile part, a machine mechanism part, a housing for office equipment or a domestic electrical appliance, and its parts, general miscellaneous goods or the like.

In particular, since the molded product or film has excellent transparency and heat resistance, these characteristics are highly useful in the following applications. That is, the molded product and film are used for lenses of cameras, VTRs, Projection TVs or the like, finders, filters, prisms, Fresnel lenses or the like, as parts relating to video equipment, and various optical disc substrates (VD, CD, DVD, MD, LD or the like), protecting films for various disk substrates, optical discs player pickup lenses, optical fibers, optical switches, optical connectors or the like, as parts relating to optical recording or optical transmission. As parts relating to information equipment, the molded product and film are used as light guide plates of liquid crystal displays, flat panel displays and plasma displays, Fresnel lenses, polarizing plates, polarizing plate protection films, phase difference films, light diffusing films, films for enlarging the angle of a field of view, reflection films, films for preventing reflection, glare-proof films, brightness-improving films, prism sheets, pickup lenses, electric conduction films for touch panels, covers or the like. As parts relating to transportation equipment such as automobiles, the molded product and film are used to tail lamp lenses, head lamp lenses, inner lenses, amber caps, reflectors, extensions, rearview mirrors, room mirrors, side visors, meter hands, meter covers, glazing for window panes or the like. As parts relating to medical equipment, the molded product and film are used as glasses lenses, glasses frames, contact lenses, endoscopes, optical cells for analysis or the like. As parts relating building materials, the molded product and film are used as daylighting window, a light transmission plate for road, an illuminator cover, a sign, a translucent sound isolation wall, a material for bathtubs or the like.

Hereinafter, the constitutions and effects will be explained in more detail with examples. However, compositions and methods are not limited to the following examples. The methods used to measure the various properties in the examples are described, before describing each example.

(1) Weight-average Molecular Weight (Absolute Molecular Weight)

The thermoplastic polymer (A) was dissolved in dimethylformamide to obtain a measurement sample. The dimethylformamide was used as the solvent, and the weight-average molecular weight (absolute molecular weight) was measured using gel permeation chromatography (515-type pump, produced by Waters Company and TSK-gel-GMH$_{XL}$ column, produced by Tosoh Co., Ltd), which was equipped with a DAWN-DSP-type multiple angle light-scattering photometer (produced by Wyatt Technology Company).

(2) Glass Transition Temperature (Tg)

The glass transition temperature was measured while raising the temperature by 20° C./minute under a nitrogen atmosphere using a differential scanning calorimeter (DSC-7 type produced Perkin-Elmer Company).

(3) Heat Distortion Temperature

The thermoplastic resin composition was subjected to injection molding at the temperature of the glass transition temperature of the thermoplastic polymer (A) plus 150° C. to obtain a plate-shaped test piece of 127 mm×12.7 mm×6.4 mm. Using the obtained plate-shaped test piece, the thermal deformation temperature was measured according to ASTM D648 (the load is 1.82 MPa) to evaluate the heat resistance.

(4) Transparency (Total Light Transmittance, Haze)

The thermoplastic resin composition was subjected to injection molding at the temperature of the glass transition temperature of the thermoplastic polymer (A) plus 150° C. to obtain a molded product of 70 mm×70 mm×2 mm. Using a direct read-type haze meter produced by Toyoseiki Co., Ltd., the total light transmittance (%) and the haze (turbidity) (%) of the obtained molded product were measured at 23° C. to evaluate the transparency.

Furthermore, in the case of measuring the transparency of the molded product, in which the thickness is not 2 mm, the transparency may be measured by pulverizing the molded product at once and molding the molded product of 70 mm×70 mm×2 mm under the above-mentioned conditions.

(5) Izod Impact Strength (Izod Impact Value)

The thermoplastic resin composition was subjected to injection molding at the temperature of the glass transition temperature of the thermoplastic polymer (A) plus 150° C. to obtain a test piece with a notch having a thickness of 12.7 mm according to ASTM D-256. Using the obtained test piece, the Izod impact strength was measured at 23° C. according to ASTM D-256 to evaluate the impact characteristics.

(6) Elongation at Break

The thermoplastic resin composition was supplied to a single screw extruder having a diameter of 40 mm, which was equipped with a T-die to produce a film having a width of 200 mm and a vent, and this composition was extruded at the rate of 10 kg/h at 280° C. to obtain a film having a thickness of 0.1 mm. The obtained film was punched to form an ASTM-No. 1 dumbbell as a test piece, and the tensile elongation at break was measured according to JIS K-7113.

(7) Stress Optical Coefficient

The thermoplastic resin composition was dissolved in methylethylketone to obtain a solution having a concentration of 25 percent by weight. The obtained solution was used to make a non-oriented film having a thickness of about 100 μm (100±5 μm) by the cast method. The stress (σ) was measured by uniaxially stretching the non-oriented film 1.5 times at the rate of 0.5 mm/sec at the temperature of the glass transition temperature of the thermoplastic polymer (A) plus 5° C. The retardation (Re) was measured by irradiating a laser light on the sample surface of the stretched film with an angle of 90 degrees at 23° C. using an ellipsometer (LCD cell gap inspection apparatus, RETS-1100, produced by Otsuka Electronics Co., Ltd.) and measuring the retardation of transmitted light at 633 nm. Furthermore, the thickness (d) of the stretched film at 23° C. was measured using a Digimatic Indicator made by Mitutoyo Corporation. Then, the stress optical coefficient was calculated from the following formula, based on (σ), (Re) and (d).

$$\text{Stress Optical Coefficient} = Re \text{ (nm)} / d \text{ (nm)} / \sigma(Pa)$$

(8) Refractive Index, Difference in Refractive Indexes

The soluble fraction (component A) and the insoluble fraction (component B) in acetone were separated by adding acetone to the thermoplastic resin composition, refluxing for 4 hours, and centrifuging for 30 minutes at 9,000 rpm. These fractions were dried under reduced pressure for 5 hours at 60° C. The obtained solid products were pressed at 250° C. to form films having a thickness of 0.1 mm. Then, the refractive index at a wavelength of 550 mm and 23° C. was measured with an Abbe refractometer (DR-M2, produced by Atago Co., Ltd.). The absolute value of the difference in the refractive index of component A and the refractive index of component B was the difference in the refractive indexes.

(9) Composition of Each Component

For the soluble fraction (component A) in acetone separated and extracted as above (8), $^1$H-NMR was measured at 30° C. to determine the composition of each copolymer component. Furthermore, for the insoluble fraction (component B) in acetone separated and extracted as above (8), the generation of the glutaric anhydride-containing component was confirmed by the presence of absorption peaks at 1,800 cm$^{-1}$ and 1,760 cm$^{-1}$, which are the characteristic peaks of the glutaric anhydride-containing component, by infrared spectroscopy.

(10) Yellowness Index (YI)

The thermoplastic polymer (A) or the thermoplastic resin composition was subjected to injection molding at temperature of the glass transition temperature of the thermoplastic polymer (A) plus 150° C. to obtain a molded product of 70 mm×70 mm×2 mm. YI value of the obtained molded product was measured using an SM color computer (produced by Suga Test Instruments Co. Ltd.) according to JIS-K7103.

Furthermore, in the case of measuring the yellowness index of the molded product, in which the thickness is not 2 mm, the index may be measured by pulverizing the molded product and molding the molded product of 70 mm×70 mm×2 mm under the above-mentioned conditions.

(11) Flowability

As for the thermoplastic resin composition, a melt index (MI value) at the temperature of the glass transition temperature of the thermoplastic polymer (A) plus 150° C. and a load of 37.3 N was measured according to the ISO-R1133 method.

(12) Solvent Resistance

The thermoplastic resin composition was subjected to injection molding at the temperature of the glass transition temperature of the thermoplastic polymer (A) plus 150° C. to obtain a plate-shaped molded product of 12.5 mm×125 mm×1.6 mm shown in FIG. 1 as a test piece. The molded product was fixed on a curved surface 3 of the ¼-elliptic jig 2 as shown in FIG. 1. Then, a wax remover (wax remover CPC, produced by Yushiro Chemical Co. Ltd.) or a mixed solvent of toluene/methylisobutyleneketone, in which the weight ratio was 50/50 percent by weight, was coated on the entire surface of the molded product. After leaving for 24 hours at 23° C., the presence cracks and their positions were evaluated. FIG. 1 is a schematic view of a ¼-elliptic jig and a plate-shaped molded product used in this evaluation. The shortest lengths (X) in the long axis direction at the positions where cracks appeared were measured, and the critical strain τ(%) was calculated with the following formula. A composition having a critical strain of more than 0.6% was assessed as O, and that of less than 0.6% was assessed as X.

$$\tau = b/2a^2 \{1-(a^2-b^2)X^2/a^4\}^{-3/2} \times t \times 100$$

τ: the critical strain (%)
a: the long axis of the jig (127 mm)
b: the short axis of the jig (38.1 mm)
t: the thickness of the test piece (1.6 mm)
X: the shortest lengths in the long axis direction at the positions where cracks appeared (mm)

REFERENCE EXAMPLE (1)

Synthesis of the copolymer (a)

(a-1)

Twenty parts by weight of methyl methacrylate, 80 parts by weight of acrylamide, 0.3 parts by weight of potassium persulfate and 1,500 parts by weight of ion-exchanged water were places in a reaction vessel, and the inside of the reaction vessel was filled with nitrogen gas while maintaining a temperature of 70° C. The reaction was continued until the monomer had completely changed to the polymer, and an aqueous solution of methyl methacrylate/acrylamide copolymer was obtained. The obtained aqueous solution was used as a suspension. The solution, in which 0.05 parts by weight of the methyl methacrylate/acrylamide copolymer suspension were dissolved in 165 parts by weight of ion-exchanged water, was placed in an autoclave made of stainless steel with a capacity of 5 l comprising baffles or a pfaudler-type stirring blade, and the solution was stirred at 400 rpm, and the inside of the system was filled with nitrogen gas. Next, the following mixed substance was added while stirring the reaction system, and the temperature was increased to 70° C. When the inside temperature reached 70° C., it was assumed that the polymerization had started, and after maintaining it under these conditions for 180 minutes, the polymerization had finished. Then, reaction system was cooled, and the polymer was separated, washed and dried according to a conventional method. Then, a bead-like copolymer (a-1) was made. The polymerization rate of the copolymer (a-1) was 98%, and the weight-average molecular weight was 90,000.

| | |
|---|---|
| Methacrylic acid | 27 parts by weight |
| Methyl methacrylate | 73 parts by weight |
| t-dodecylmercaptan | 1.5 parts by weight |
| 2,2' azobisisobutyronitrile | 0.4 parts by weight |

(a-2)

A copolymer (a-2) was made by the same production method in (a-1) except that the amount of t-dodecylmercaptan added as a chain transfer agent was changed to 2.0 parts by weight. The polymerization rate was 97%, and the weight-average molecular weight was 70,000.

(a-3)

A copolymer (a-3) was made by the same production method in (a-1) except that the amount of t-dodecylmercaptan added as the chain transfer agent was changed to 1.2 parts by weight. The polymerization rate was 97%, and the weight-average molecular weight was 130,000.

(a-4)

A copolymer (a-4) was made by the same production method in (a-1) except that the compositions of the monomer mixture and the chain transfer agent were changed as follows. The polymerization rate was 95%, and the weight-average molecular weight was 100,000.

| | |
|---|---|
| Methacrylic acid | 15 parts by weight |
| Methyl methacrylate | 75 parts by weight |
| Styrene | 10 parts by weight |
| n-dodecylmercaptan | 1.5 parts by weight |

(a-5)

A copolymer (a-5) was made by the same production method in (a-1) except that the amount of t-dodecylmercaptan added as the chain transfer agent was changed to 0.4 parts by weight. The polymerization rate was 97%, and the weight-average molecular weight was 220,000.

REFERENCE EXAMPLE (2)

Production of the Thermoplastic Copolymer (A)

One hundred parts by weight of various copolymers (a) made in Reference example (1) were blended with the additive shown in Table 1, and was supplied to a twin-screw extruder (TEX30, (produced by Japan Steel Works Co., Ltd., L/D 44.5). While purging with nitrogen at a rate of 10L/minute from the hopper part, the intramolecular cyclization reaction was carried out with the screw rotating at 100 rpm, the material being supplied at 5 kg/h, and the cylinder temperature at 290° C. Then, a pellet-like thermoplastic copolymer (A) was obtained.

Next, the pellet after drying for 3 hours at 100° C. was subjected to injection molding (M-50AII-SJ, produced by Meiki Co., Ltd.) to mold each test piece. The molding conditions were as follows: The molding temperature was the temperature of the glass transition temperature plus 150° C.; the metal mold temperature was 80° C.; the injection speed was 90 cm³/second; the injection time was 10 seconds; the cooling time was 30 seconds; the molding pressure was the pressure at which all the resin was filled in the metal mold (the lower limit molding pressure) plus 1 MPa.

The results of each copolymer component composition determined by $^1$H-NMR, and various other evaluated properties are shown in Table 1.

parts by weight of styrene and 1 part by weight of allyl methacrylate (a crosslinking agent) were prepared. The mixture was reacted at 70° C. for 30 minutes to obtain a core layer polymer. Next, a mixture consisting of 21 parts by weight of methyl methacrylate, 9 parts by weight of methacrylic acid and 0.005 parts by weight of potassium persulfate were continuously added for 90 minutes to polymerize the shell layer. The polymer latex was solidified with sulfuric acid and neutralized with caustic soda, and then, the latex was washed, filtrated and dried. Thus, a rubber-containing polymer compound having a two-layered structure (B-1-1) was obtained. When the polymer was measured with an electron microscope, the number average particle size of the polymer particles was 155 nm.

(B-1-2)

A rubber-containing polymer compound having a two-layered structure (B-1-2) was obtained as above (B-1-1) except that the mixture composition to prepare the shell comprised 30 parts by weight of methyl methacrylate and 0.005 parts by weight of potassium persulfate. When the polymer was measured with the electron microscope, the number average particle size of the polymer particles was 150 nm.

(B-1-3)

Metablen®W377 produced by Mitsubishi Rayon Co. Ltd., (the core is the acrylic polymer and the shell is methyl methacrylate polymer)

(B-2)

Polybutadiene (the weight-average particle size was 0.35 μm) 50 parts by weight (solid equivalent)

TABLE 1

| | Copolymer (a) used | Additive (Parts by weight) | Copolymeric composition of thermoplastic polymer (A) (wt %) | | | | Weight-average molecular weight of thermoplastic polymer (A) | Tg (° C.) | YI | Transparency | | Flowability (g/10 minutes) |
|---|---|---|---|---|---|---|---|---|---|---|---|---|
| | | | (i) GAH | (ii) MMA | (iii) MAA | (iv) St | | | | Total light transmittance (%) | Haze (%) | |
| A-1 | (a-1) | NaOCH₃ (0.1) | 31 | 69 | 0 | — | 90000 | 140 | 2.0 | 92 | 1.1 | 17.1 |
| A-2 | (a-2) | | 30 | 69 | 1 | — | 70000 | 140 | 1.7 | 93 | 0.7 | 21.3 |
| A-3 | (a-3) | | 30 | 69 | 1 | — | 130000 | 140 | 2.2 | 93 | 1.0 | 11.5 |
| A-4 | (a-4) | | 16 | 73 | 2 | 9 | 100000 | 132 | 2.8 | 87 | 2.9 | 16.5 |
| A-5 | (a-5) | | 31 | 69 | 0 | — | 220000 | 140 | 14.2 | 89 | 6.1 | 2.2 |

(Copolymeric Composition)
GAH is a glutaric anhydride component.
MMA is a methyl methacrylate component.
MAA is a methacrylic acid component.
St is a styrene component.

REFERENCE EXAMPLE (3)

Rubber-containing Polymer Compound (B)

(B-1-1)

One hundred and twenty parts by weight of deionized water, 0.5 parts by weight of potassium carbonate, 0.5 parts by weight of dioctyl sulfosuccinate and 0.005 parts by weight of potassium persulfate were placed in a 5-L glass vessel equipped with a cooling device, and stirred under a nitrogen atmosphere. Then, 53 parts by weight of butyl acrylate, 17

| | |
|---|---|
| Polybutadiene (the weight-average particle size was 0.35 μm) | 50 parts by weight (solid equivalent) |
| Potassium oleate | 0.5 parts by weight |
| Glucose | 0.5 parts by weight |
| Sodium pyrophosphate | 0.5 parts by weight |
| Ferrous sulfate | 0.005 parts by weight |
| Deionized water | 120 parts by weight |

The above-mentioned substances were placed in a polymerizing vessel, and the temperature was increased to 65° C.

while stirring. When the internal temperature had reached 65° C., it was assumed that the polymerization had started, and 50 parts by weight of mixture consisting of 70 parts by weight of styrene, 30 parts by weight of acrylonitrile and 0.3 parts by weight of t-dodecylmercaptan was continuously added dropwise for 5 hours. Simultaneously, an aqueous solution consisting of 0.25 parts by weight of cumene hydroperoxide, 2.5 parts by weight of potassium oleate and 25 parts by weight of pure water was continuously added dropwise for 7 hours, and then, the reaction was finished. The obtained graft copolymer latex was solidified with sulfuric acid and was neutralized with caustic soda, and then, the latex was washed, filtrated and dried. Then, a graft copolymer (B-2) was obtained. The graft ratio of this graft copolymer (B-2) was 45%, and the intrinsic viscosity of the soluble fraction in acetone was 0.36 dl/g at 30° C. in the methylethylketone solvent.

EXAMPLES 1 TO 5, COMPARATIVE EXAMPLES 1 TO 6

The thermoplastic polymer (A) obtained in the above Reference example (2) and the rubber polymer (B) obtained in Reference example (3) were blended at the composition ratio shown in Table 2, and kneaded with the screw rotating at 150 rpm and the cylinder temperature at 280° C. using a twin-screw extruder (TEX30, (produced by Japan Steel Works Co., Ltd., L/D=44.5). Then, a pellet-like thermoplastic resin composition was obtained. Next, the pellet after drying at 100° C. for 3 hours was subjected to the injection molding (M-50AII-SJ, produced by Meiki Co., Ltd.) to mold each test piece. The molding conditions were as follows: The molding temperature was the temperature of the glass transition temperature plus 150° C.; the metal mold temperature was 80° C.; the injection speed was 90 cm³/second; the injection time was 10 seconds; the cooling time was 30 seconds; the molding pressure was the pressure at which all the resin was filled in the metal mold (the lower limit molding pressure) plus 1 MPa.

Furthermore, in Comparative examples 4 and 5, PMMA (DELPET®80N, produced by Asahi Chemical Industry Co., Ltd.) was used instead of the thermoplastic polymer (A). Furthermore, in Comparative example 6, PC (IUPILON®S300, produced by Mitsubishi Engineer Plastics Co., Ltd.) was used. The test pieces for evaluation were obtained in the above comparative examples by performing injection molding under the same above-mentioned conditions. Theses results are shown in Table 3.

TABLE 2

| | Preparation | | | | Copolymeric composition of thermoplastic polymer (A) (wt %) | | | | After kneading | |
|---|---|---|---|---|---|---|---|---|---|---|
| | Thermoplastic polymer (A) | | Rubber polymer (B) | | | | | | GAH-containing | Refractive index difference in (A) and (B) |
| | Kind | Parts by weight | Kind | Parts by weight | (i) GAH | (ii) MMA | (iii) MAA | (iv) St | rubber polymer (B) | |
| Example 1 | (A-1) | 80 | (B-1-1) | 20 | 31 | 69 | 0 | — | Containing | 0.002 |
| Example 2 | (A-2) | 80 | (B-1-1) | 20 | 30 | 69 | 1 | — | Containing | 0.001 |
| Example 3 | (A-3) | 80 | (B-1-1) | 20 | 30 | 69 | 1 | — | Containing | 0.001 |
| Example 4 | (A-1) | 80 | (B-1-3) | 20 | 31 | 69 | 0 | — | Not containing | 0.016 |
| Example 5 | (A-3) | 80 | (B-1-2) | 20 | 30 | 69 | 1 | — | Not containing | 0.012 |
| Comparative example 1 | (A-1) | 80 | (B-2) | 20 | 31 | 69 | 0 | — | Not containing | 0.068 |
| Comparative example 2 | (A-4) | 80 | (B-1-3) | 20 | 16 | 73 | 2 | 9 | Not containing | 0.002 |
| Comparative example 3 | (A-5) | 80 | (B-1-1) | 20 | 31 | 69 | 0 | — | Containing | 0.001 |
| Comparative example 4 | | PMMA | | | | | | | | |
| Comparative example 5 | PMMA | 80 | (B-1-3) | 20 | — | 100 | — | — | Not containing | 0.002 |
| Comparative example 6 | | PC | | | | | | | | |

TABLE 3

| | Transparency | | Heat distortion temperature (° C.) | Izod impact value (J/m) | Tensile breaking elongation (%) | Flowability (g/10 minutes) | YI | Solvent resistance | | Optical isotropy Stress optical coefficient (×10⁻¹² Pa⁻¹) |
|---|---|---|---|---|---|---|---|---|---|---|
| | Total light transmittance (%) | Haze (%) | | | | | | Wax remover | Toluene/MIBK mixed solvent | |
| Example 1 | 92 | 0.8 | 117 | 80 | 27 | 16.3 | 2.1 | ○ | ○ | 2.9 |
| Example 2 | 93 | 0.8 | 117 | 72 | 25 | 20.1 | 2.0 | ○ | ○ | 2.8 |
| Example 3 | 92 | 0.9 | 119 | 95 | 35 | 10.2 | 2.4 | ○ | ○ | 3.1 |
| Example 4 | 90 | 2.9 | 115 | 63 | 22 | 15.6 | 3.3 | ○ | ○ | 4.4 |
| Example 5 | 91 | 2.0 | 117 | 60 | 21 | 9.7 | 2.8 | ○ | ○ | 4.2 |
| Comparative example 1 | 41 | 35.2 | 116 | 67 | 22 | 15.1 | 4.1 | ○ | X | 9.4 |

TABLE 3-continued

| | Transparency | | Heat distortion temperature (° C.) | Izod impact value (J/m) | Tensile breaking elongation (%) | Flowability (g/10 minutes) | YI | Solvent resistance | | Optical isotropy Stress optical coefficient (×10⁻¹² Pa⁻¹) |
|---|---|---|---|---|---|---|---|---|---|---|
| | Total light transmittance (%) | Haze (%) | | | | | | Wax remover | Toluene/ MIBK mixed solvent | |
| Comparative example 2 | 85 | 2.8 | 107 | 55 | 18 | 15.8 | 3.5 | ○ | X | 17.2 |
| Comparative example 3 | 88 | 6.5 | 117 | 73 | 31 | 1.8 | 15.8 | ○ | ○ | 5.7 |
| Comparative example 4 | 93 | 1.0 | 100 | 25 | 5 | 13.7 | 1.9 | X | X | 6.4 |
| Comparative example 5 | 92 | 1.2 | 85 | 60 | 25 | 11.2 | 2.2 | X | X | 6.8 |
| Comparative example 6 | 89 | 1.3 | 133 | 520 | 100 | 10.1 | 2.4 | X | X | 72.1 |

From the results of Examples 1 to 5 and Comparative examples 1 to 6, it was confirmed that the thermoplastic resin composition has high heat resistance, superior mechanical properties, excellent transparency, and high optical isotropy and solvent resistance. In particular, by containing the rubber-containing polymer compound (B) having the specific glutaric anhydride-containing component, the thermoplastic resin composition can have the furthermore higher transparency and mechanical properties, such as impact resistance.

On the other hand, when the refractive index of the thermoplastic copolymer (A) does not approximate to that of the rubber-containing polymer compound (B) (Comparative example 1), or any amount of the aromatic group-containing component, such as styrene or the like, is contained in the thermoplastic copolymer (A) (Comparative example 2), it was found that the transparency was substantially decreased. Furthermore, when the thermoplastic copolymer (A) has remarkably high molecular weight (Comparative example 3), the color tone at the time of heating and melting is substantially deteriorated, and the transparency is decreased in accordance with the deterioration of color tone, thus high transparency cannot be obtained.

Furthermore, it was confirmed that the thermoplastic resin composition is a material having high transparency, and excellent heat resistance, impact resistance, optical isotropy and solvent resistance, compared with PPMA (Comparative examples 4, 5) and PC (Comparative example 6).

Industrial Applicability

It is possible to obtain a thermoplastic resin composition having high colorless transparency, optical isotropy and moldability (flowability), which have been required in recent years, together with high heat resistance and superior mechanical properties, as well as solvent resistance.

Furthermore, the molded product and film containing the thermoplastic resin composition is useful in applications such as the parts relating to video equipment, parts relating to optical recording or optical transmission, parts relating to information equipment, parts relating transportation equipment such as automobiles or the like, parts relating to medical equipment, parts relating to building materials, or the like, since the molded product and film have the excellent transparency and heat resistance.

The invention claimed is:

1. A molded product containing a thermoplastic resin composition comprising a thermoplastic polymer (A) containing a glutaric anhydride-containing component shown in general formula (1),

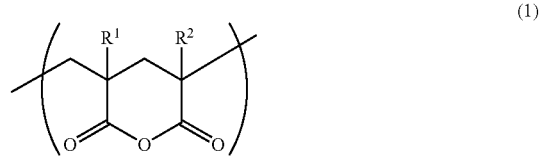

where $R^1$ and $R^2$ are the same or different and each represents a hydrogen atom or an alkyl group having 1 to 5 carbon atoms, and a multilayered polymer (B-1) comprising a rubber core and a covalently attached shell comprising a polymer containing the glutaric anhydride-containing component shown in general formula (1),
wherein the glutaric anhydride-containing component is covalently attached to the rubber core and said molded product has a total light transmittance per 2 mm of the thickness of the molded product of more than 90%.

2. The molded product according to claim 1, wherein the weight-average molecular weight of the thermoplastic polymer (A) is from 30,000 to 150,000 and the glass transition temperature is more than 130° C.

3. The molded product according to claim 1, wherein haze per 2 mm of the thickness is 3% or less.

4. The molded product according to claim 1, wherein heat distortion temperature is at least 100° C.

5. The molded product according to claim 1 wherein said polymer is copolymer-containing 10 percent by weight or less of an unsaturated carboxylic acid component (iii), and/or 10 percent by weight or less of another vinyl monomer component (iv), in addition to the above (i) and (ii) components.

6. The molded product according to claim 1, wherein a number average particle size of the multilayered polymer (B-1) is 0.05 to 1 μm.

7. The molded product according to claim 6, wherein the difference in refractive indexes of the thermoplastic polymer (A) and the rubber polymer (B) is 0.01 or less.

8. The molded product according to claim 1, wherein the difference in refractive indexes of the thermoplastic polymer (A) and the rubber polymer (B) is 0.02 or less.

9. The molded product according to claim 1, wherein a stress optical coefficient is $5\times10^{-12}$ $Pa^{-1}$ or less.

10. The molded product according to claim 1, wherein the thermoplastic polymer (A) is a copolymer containing 25 to 50 percent by weight of the glutaric anhydride-containing component (1) shown in the above formula (1), and 50 to 75 percent by weight of an alkyl unsaturated carboxylate component (ii).

11. The molded product according to claim 5, wherein the content of an aromatic vinyl monomer component in the other vinyl monomer component (iv) is 5 percent by weight or less.

12. The molded product according to claim 1, wherein the multilayered polymer (B-1) contains an alkyl acrylate component and a substituted or unsubstituted styrene component.

13. The molded product according to claim 1, wherein the rubber core also contains an alkyl acrylate component and a substituted or unsubstituted styrene component.

14. The molded product according to claim 1, wherein the molded product is a film.

* * * * *